(No Model.)
G. D. ELGES.
CIGAR MOLDING MACHINE.
No. 375,615. Patented Dec. 27, 1887.
Fig. 1,
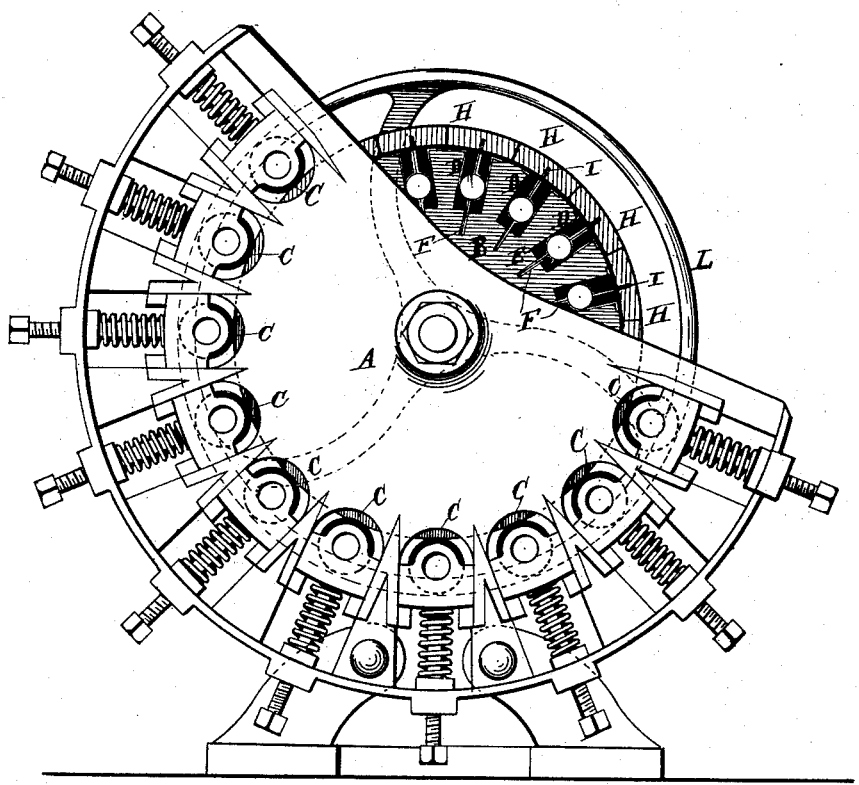
Fig. 2, Fig. 3,
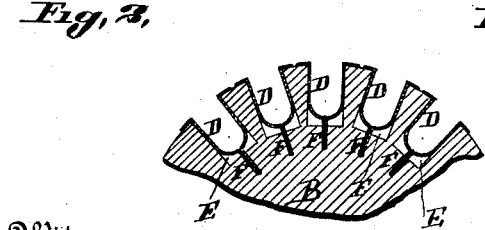 
Witnesses
H. B. Knight
Edward Steer
Inventor
G. D. Elges
By his Attorneys
Knight Bros

UNITED STATES PATENT OFFICE.

GOTTLIEB D. ELGES, OF CLINTON, MISSOURI.

CIGAR-MOLDING MACHINE.

SPECIFICATION forming part of Letters Patent No. 375,615, dated December 27, 1887.

Application filed August 30, 1886. Serial No. 212,226. (No model.)

*To all whom it may concern:*

Be it known that I, GOTTLIEB D. ELGES, a citizen of the United States, residing at Clinton, in the county of Henry and State of Missouri, have invented a certain new and useful Improvement in Cigar-Molding Machines, of which the following is a full, clear, and exact description, reference being had to the accompanying drawings, forming part of this specification, and in which—

Figure 1 is an end view of a cigar-molding machine illustrating my invention. Fig. 2 is a detail section of the drum, showing the lower cups of the molds secured therein. Fig. 3 is section of a number of the upper cups of the molds.

This invention relates to an improvement on Letters Patent No. 237,665, issued March 9, 1886; and it consists in features of novelty hereinafter fully described, and pointed out in the claims.

Referring to the drawings, A represents the frame, B the drum, and C the spring pressing-rollers, all of which are the same as in the patent mentioned, except that the drum is formed differently to receive the lower cups of the molds.

D represents the lower cups of the molds, which are held in rectangular recesses E, formed in the drum, these parts of the molds having bottom fins or extensions, F, that enter saw-cuts in the drum at the bottoms of the openings E, as shown most clearly in Fig. 2.

G represents the upper cups of the molds, which are secured to supports H by fins or projections I thereon entering saw-cuts in the supports, as shown most plainly in Fig. 3.

Each cup is supported on either side by a strip, J, properly secured thereto, beyond which the edges of the cups extend, forming flexible sides, which, as they enter the lower cups of the molds, contract inwardly, as shown and described in my application for improvement in molds, filed herewith, No. 212,227.

When the cigar-filler is placed in the mold and the upper cup placed in position, the drum is turned, and as the cup passes the rollers C it is forced and held against the drum, compressing the tobacco, its flexible sides yielding to and contracting under the pressure of the rollers. As a means for turning the drum in the patent mentioned, a cross is shown, which has the disadvantage of the loss of power, for in grasping an arm of the cross it is done close to the shaft of the drum. To obviate this difficulty I place a hand-wheel, L, upon the shaft of the drum in lieu of the cross. By taking hold of its rim, a greater purchase is had than would be had were the operator to take hold of one of the arms of the wheel, which would represent an arm of the cross of the said patent. Another advantage of the wheel is that a portion of it is always within convenient reach of the operator, and he does not have to reach farther than is convenient at any time to turn the drum.

I am aware that it is not new to form the cups of a cigar-mold with flexible sides, and do not claim such, *per se*, as my invention.

I claim as my invention—

1. In a cigar-molding machine, in combination with the drum provided with recesses adapted to receive the lower cups of the molds, and the upper cups of the molds having flexible sides, the spring-rollers for forcing the upper cups of the molds into the lower cups, substantially as shown and described.

2. The lower member of a cigar-mold, consisting of a drum, B, having longitudinal recesses E cut directly in the periphery thereof, and the cups secured in said recesses, in combination with the upper cups, substantially as set forth.

3. The lower member of a cigar-mold, consisting of a drum, B, having longitudinal recesses E cut directly in the periphery thereof, and the metallic cups D, having flexible sides, secured in said recesses, in combination with an upper member, substantially as set forth.

4. The combination, with the upper cups of a cigar-mold having elastic compressible sides, of the lower member, consisting of a drum having radial longitudinal recesses cut directly into the periphery thereof, and metallic cups secured in said recesses and having elastic expansible sides, substantially as set forth.

5. In a cigar-molding machine, the combination, with the rotary drum and suitable backing and blocks, of the mold-cups secured to said drum and the backings, substantially in the manner described, said cups having flexible sides, whereby the two parts are held together, substantially as set forth.

GOTTLIEB D. ELGES.

In presence of—
GEO. H. KNIGHT,
EMIL BERGER.